United States Patent Office 3,611,526
Patented Oct. 12, 1971

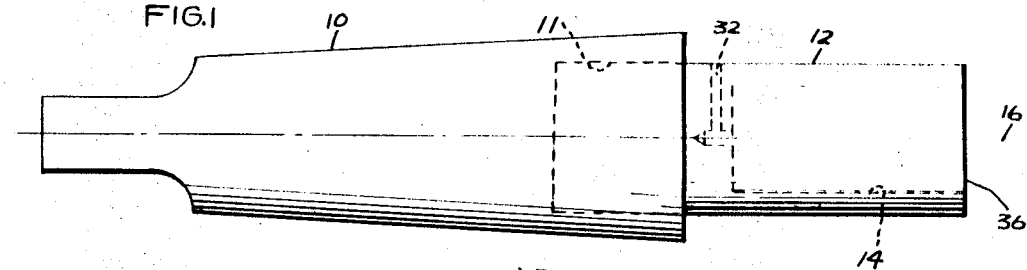
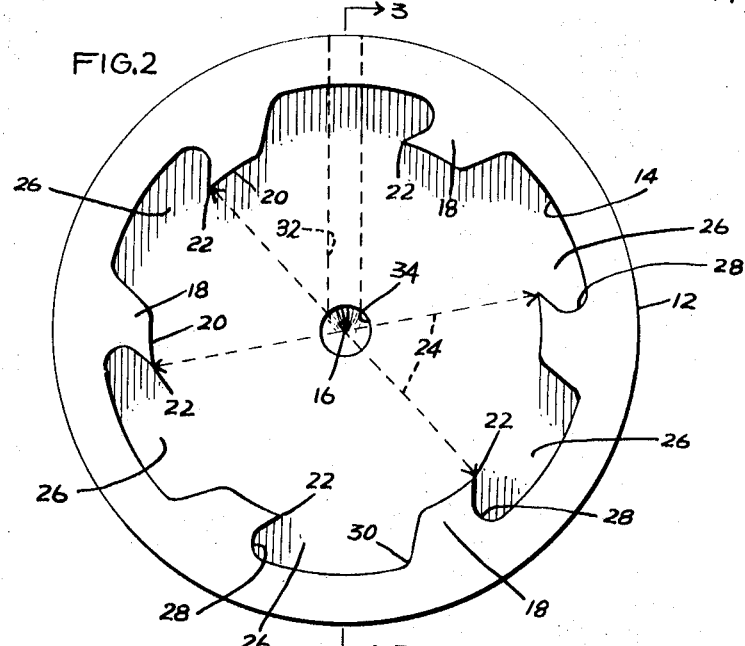
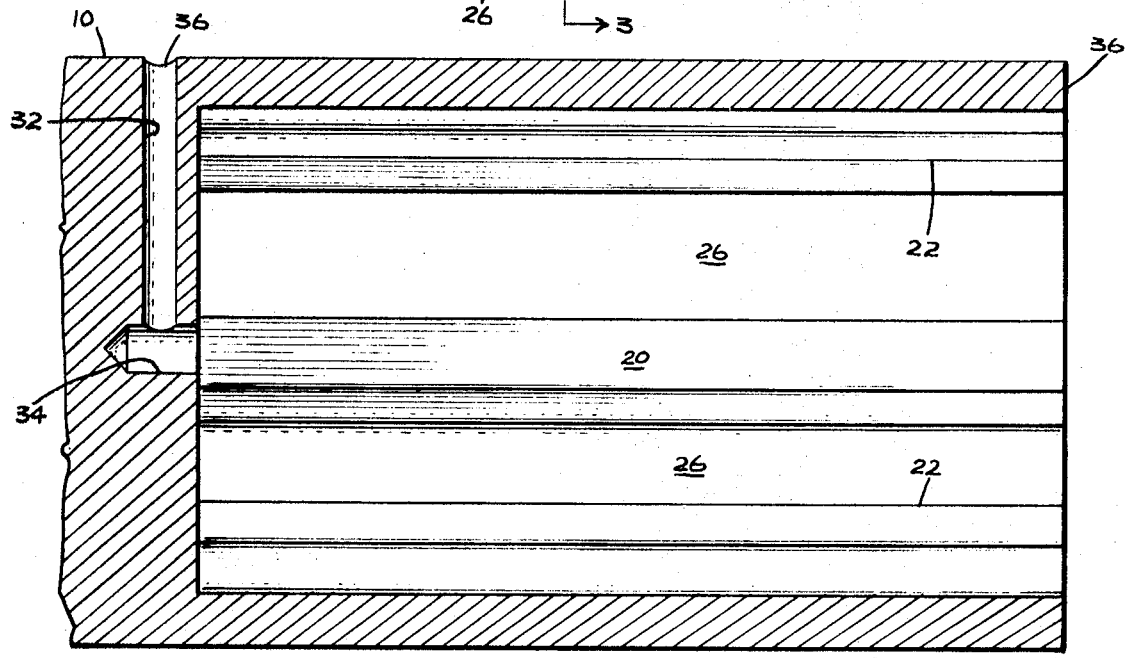

3,611,526
EXTERNAL REAMER
William M. Scribner, 112 E. 7th St.,
Alexandria, Ind. 46001
Filed Sept. 17, 1969, Ser. No. 858,820
Int. Cl. B26d 1/00, 1/12
U.S. Cl. 29—95    6 Claims

ABSTRACT OF THE DISCLOSURE

This invention is an external reamer which includes an elongated body having an elongated cavity opening through one end thereof. A plurality of cutting bits integral with said body are located within said cavity. The bits project radially inwardly from the peripheral surface of the cavity and carry on the radially inner extremities thereof part-cylindrical bearing surfaces which lie on an imaginary cylinder coaxial with the longitudinal axis of the cavity. Each bearing surface is provided with an elongated cutting edge, there being at least two cutting edges disposed substantially diametrically opposite each other. The bits are circumferentially spaced apart to provide chip clearances therebetween, the cutting edges in cross-section being defined by apices of V-shaped portions on the bits, respectively. The cutting edges are disposed in radially overlying relationship with adjacent portions of the clearances, respectively. The cross-sectional portions of the cavity peripheral surface which merge with the bits are curved such that chips may feed smoothly and without interference from the cutting edges into the clearances. This tool can be used for high speed production of parts which are turned to close tolerances.

BACKGROUND OF THE INVENTION

Field of the invention

This invention relates generally to metal-working tools and more particularly to an external reamer which may be used for high speed production at close tolerances.

Description of the prior art

Reamers are well known for use in sizing and finishing holes which are rough bored in workpieces. Such reamers have relatively long work heads which lead to substantial accuracy in achieving close tolerances in a finished bore.

SUMMARY OF THE INVENTION

In accordance with the broader aspects of this invention, there is provided an external reamer useful in sizing and finishing cylindrical surfaces to substantially the same degree of accuracy and finish as is possible with inside reamers. The external reamer of this invention includes an elongated body having an elongated cavity opening through one end thereof, a plurality of cutting bits integral with said body and located in the cavity, said bits projecting radially inwardly from the peripheral surface of the cavity, the bits carrying on the radially inner extremities thereof part-cylindrical bearing surfaces which lie on an imaginary cylinder coaxial with the longitudinal axis of the cavity. Each bearing surface has an elongated cutting edge, there being at least two of said cutting edges which are substantially diametrically opposite each other. The bits are circumferentially spaced apart to provide chip clearances therebetween, the cutting edges in cross-section being defined by apices of V-shaped portions on said bits, respectively. The cutting edges radially overlie adjacent portions of the clearances, respectively, and the cross-sectional portions of the cavity peripheral surface merge with the bits in curved surfaces whereby chips may feed smoothly and without interference from the cutting edges into the clearances.

It is an object of this invention to provide an outside or external reamer for sizing and finishing rough formed, cylindrical surfaces.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

In the drawings:

FIG. 1 is a side view of an embodiment of this invention;

FIG. 2 is an end view of the cutting head thereof; and

FIG. 3 is a partial longitudinal section taken substantially on section line 3—3 of FIG. 2 showing the cutting head portion only.

Referring to the drawings, the embodiment there shown includes a bar-like structure of tool steel or the like having a tapered shank or arbor 10 and a cylindrical cutting head 12 integral therewith or separable therefrom. The arbor 10 is frusto-conical in shape and is a coaxial extension of the cutting head 12. Also, the cutting head 12 is of smaller diameter than the largest portion of the arbor 10, and in the preferred embodiment, the two parts are separate, the head 12 interchangeably securely fitting into a coaxial socket 11 in the end of the arbor 10.

The cutting head 12 is elongated and contains a generally cylindrical cavity 14 coaxial with the longitudinal axis 16 of the tool. A plurality of cutting bits 18 integral with the cutting head 12 are located in the cavity 14 and project radially inwardly from the peripheral surface of the cavity 14. These bits 18 carry on the radially inner extremities thereof part-cylindrical bearing surfaces 20 which lie on an imaginary cylinder coaxial with the longitudinal axis 16. Each bearing surface 20 has an elongated cutting edge 22 which extends parallel to the axis 16. At least two of the cutting edges 22 are diametrically opposite each other as indicated by the dashed line arrows 24; however, it is preferred that all the cutting edges 22 have diametrically opposite counterparts which will serve not only the purpose of cutting but also as bearings for maintaining the workpiece in coaxial alignment as an operation is being performed. The bits 18 as shown in FIG. 2 are equally circumferentially spaced apart so as to provide chip clearances 26 therebetween. The cutting edges 22 in cross-section are defined by apices of V-shaped portions on the respective bits 18, the cutting edges 22 radially over-lying adjacent portions of the clearances 26. As will be observed in FIG. 2, the clearances 26 have smoothly curved walls, one wall portion being smoothly curved from the peripheral surface of the cavity 14 at 28 into the bit 18 so as to provide a smooth surface extending from the cutting edge 22 around to the cavity periphery. The curved portion 28 is thereby observed as being an undercut with respect to the cutting edge 22. The opposite wall portion of each clearance 26 is also curved at 30 so as smoothly to merge with the respective side of bit 18.

One working embodiment of this invention has a configuration substantially identical to that shown in the drawings, and typical dimensions as the diameter between the bearing surfaces 20, as indicated by the arrows 24, being about $7/16$ inch, the diameter of the cavity 14 which is uniform throughout being about $5/8$ inch, the thickness of each bit 18 measured in a direction circumferentially of the cavity 14 being about $1/16$ inch, and the length of the cavity 14 as well as all of the bits 18 being about 1⅜ inch.

While a total of six bits 18 are shown and described, other numbers of bits may be used varying from two upward without departing from the spirit and scope of this invention. However, better finishes and closer tolerances are obtained by using a larger number of bits.

A passage 32 extending radially through the solid arbor 10 as shown in FIGS. 1 and 3 communicates with a central recess 34 also in the arbor 10 which communicates with the interior of the cavity 14 as shown. Coolant may be injected into the mouth 36 of the passage 32 for introduction into the cavity 14 whereby chips may be flushed from the clearances 26 during use of the tool.

In a working embodiment of this invention, the end 36 of the cutting head 12 is machined flat in a plane normal to the axis 16. By forming this surface flat, it is possible to ream a piece to the full extent of the cylindrical portion thereof, inasmuch as there are no projecting portions on the end 36 to engage a radially outer portion of workpiece to space axially the cutting edges 22 therefrom.

In using the tool of this invention, and more especially the working embodiment previously described, a workpiece is initially rough turned to about 1/64 inch oversize in diameter. The tool of this invention is fitted into, for example, the tailstock of an ordinary lathe and the piece to be turned is secured into the chuck. The rotating piece is thereupon forced coaxially into the cavity of the cutting edge 12 and fed gradually thereinto for the full length of the piece. This operation can be performed rapidly. The more deeply the part penetrates the cutting head 12 the more bearing support it receives from the bearing surfaces 20 as well as the cutting edges 22. Thus, the finish is accurately concentric and to close tolerance.

This tool may be made to different sizes than the working embodiment herein disclosed, this working embodiment being just one example.

The tool may be employed in an ordinary lathe, a screw-machine, a turret lathe, and the like. It may be fitted into a tailstock of an ordinary lathe, in the turret of a turret-lathe, and in the end slides of a screw-machine. The bits 18 may be straight as shown and described or spiral. The tool may be made of high speed, carbon steel, carbide or the like. It may be resharpened by grinding the end 36 flat in a plane, perpendicular to the axis 16.

The tool provides for high speed production of parts turned to close tolerances and desired finishes. With all of the elements being integral as shown and described, maximum dimensional stability is provided as well as rigidity during use. It may be used repeatedly to turn out a relatively large number of parts to a desired size and finish until, of course, it becomes dull. By reason of the smooth curvatures 28 and 30 in the chip clearances, chips freely feed from the cutting edges 22 into the clearances 26 and from there out of the open end 36.

By making the head 12 separable from the arbor 10, other size heads may be used with the same arbor. The connection between the head and arbor may be by screw threads, a snug slip fit and the like, such connection being secure and such as to prevent relative rotation between the head and arbor.

Instead of a closed socket 14, the head and arbor may be provided with corresponding registering coaxial sockets or bores adapted to receive a workpiece that is relatively long. In other words, the length of the socket 14 without the cutting edges 22 could be axially extended through both the head and arbor.

While there have been described above the principles of this invention in connection with specific apparatus, it is to be clearly understood that this description is made only by way of example and not as a limitation to the scope of the invention.

What is claimed is:

1. A metal-working tool comprising an elongated body having an elongated cavity opening through one end thereof, a plurality of cutting bits integral with said body and located in said cavity, said bits projecting radially inwardly from the peripheral surface of said cavity, said bits carrying on the radially inner extremities thereof part-cylindrical bearing surfaces which lie on an imaginary cylinder coaxial with the longitudinal axis of said cavity, each bearing surface having an elongated cutting edge, at least two of said cutting edges being disposed substantially diametrically opposite each other, said bits being circumferentially spaced apart to provide chip clearances therebetween, said cutting edges in cross-section being defined by the apices of V-shaped portions on said bits, respectively, said cutting edges radially overlying adjacent portions of said clearances, respectively, the cross-sectional portions of said cavity peripheral surface which merge with said bits being curved whereby chips may feed smoothly and without interference from said cutting edges into said clearances.

2. The tool of claim 1 in which the width and length dimensions of said bits are about equal thereby imparting dimensional rigidity to said bits during operation thereof.

3. The tool of claim 1 in which said cavity peripheral surface is of uniform diameter for the length thereof which coincides with the length of said bits, said bits being of a common length and coextensive longitudinally.

4. The tool of claim 1 in which said one end is flat in the region of said bits, defining a plane normal to said longitudinal axis.

5. The tool of claim 4 in which there are a minimum of six bits substantially equally circumferentially spaced apart.

6. The tool of claim 1 in which one end of said cavity is closed and including an oil passage in a solid portion of said body which extends between the closed end of said cavity and one side of said body whereby oil may be forced through said cavity for flushing out chips.

References Cited

UNITED STATES PATENTS

| 661,554 | 11/1900 | Roberts | 29—103 A |
| 1,623,927 | 4/1927 | Lenhardt | 29—103 A |
| 2,126,476 | 8/1938 | Koonz | 29—103 A |
| 2,237,901 | 4/1941 | Chun | 29—103 AX |
| 2,337,797 | 12/1943 | Bracket | 29—103 |
| 3,037,264 | 6/1962 | Mossberg | 29—106 |

HARRISON L. HINSON, Primary Examiner

U.S. Cl. X.R.

29—103, 106